United States Patent
Sriram et al.

(10) Patent No.: US 9,489,189 B2
(45) Date of Patent: Nov. 8, 2016

(54) DYNAMICALLY GENERATE AND EXECUTE A CONTEXT-SPECIFIC PATCH INSTALLATION PROCEDURE ON A COMPUTING SYSTEM

(71) Applicant: Oracle International Corporation, Redwood City, CA (US)

(72) Inventors: Vijay N. Sriram, Bangalore (IN); Mack S. Ningombam, Bangalore (IN); Girish K. Balachandran, Mountain View, CA (US); Weishi Liu, Shenzhen (CN); Timothy C. Misner, Palo Alto, CA (US)

(73) Assignee: Oracle International Corporation, Redwood City, CA (US)

( * ) Notice: Subject to any disclaimer, the term of this patent is extended or adjusted under 35 U.S.C. 154(b) by 96 days.

(21) Appl. No.: 13/773,478

(22) Filed: Feb. 21, 2013

(65) Prior Publication Data
US 2014/0237463 A1    Aug. 21, 2014

(51) Int. Cl.
*G06F 9/445* (2006.01)

(52) U.S. Cl.
CPC . *G06F 8/65* (2013.01); *G06F 8/60* (2013.01); *G06F 8/61* (2013.01)

(58) Field of Classification Search
CPC ............. G06F 8/65; G06F 8/60; G06F 8/61
See application file for complete search history.

(56) References Cited

U.S. PATENT DOCUMENTS

| | | | |
|---|---|---|---|
| 7,478,385 B2 * | 1/2009 | Sierer et al. | 717/174 |
| 7,529,827 B2 * | 5/2009 | Devraj | G06F 17/30306 707/999.1 |
| 7,823,148 B2 | 10/2010 | Deshpande et al. | |
| 7,904,901 B1 * | 3/2011 | Tormasov | G06F 9/44505 717/178 |
| 8,181,173 B2 | 5/2012 | Childress et al. | |
| 8,468,516 B1 * | 6/2013 | Chen et al. | 717/170 |
| 2002/0124245 A1 * | 9/2002 | Maddux | G06F 8/60 717/176 |
| 2003/0093688 A1 * | 5/2003 | Helgesen et al. | 713/200 |
| 2003/0229890 A1 * | 12/2003 | Lau et al. | 717/168 |
| 2004/0015949 A1 * | 1/2004 | Taylor | 717/171 |
| 2006/0075401 A1 | 4/2006 | Smegner | |

(Continued)

OTHER PUBLICATIONS

Dunagan et al., Towards a Self-Managing Software Patching Process Using Black-Box Persistent-State Manifests, [Online] May 2004, in ICAC vol. 4, [Retrieved from the Internet] <https://www.semanticscholar.org/paper/Towards-a-Self-Managing-Software-Patching-Process-Dunagan-Roussev/73d394b568d01820d9fa7aa5c6e1b9ce0bb09c10/pdf> 8 pages.*

(Continued)

*Primary Examiner* — Thuy Dao
*Assistant Examiner* — Ravi K Sinha
(74) *Attorney, Agent, or Firm* — Robert C. Kowert; Meyertons, Hood, Kivlin, Kowert & Goetzel, P.C.

(57) ABSTRACT

A patch installation procedure may be generated and executed that is specific both to the patch and the configuration of the target computing system. Configuration data may be received that indicates the configuration of the target computing system. Installation metadata for the patch, describing the operations to be performed for installing the patch may also be received. A patch installation procedure may be generated that is based on both the configuration data and the installation metadata. This patch installation procedure may then be executed to automatically install the patch on the target computing system. In at least some embodiments, the target computing system may a distributed computing system including multiple nodes.

17 Claims, 8 Drawing Sheets

(56) References Cited

U.S. PATENT DOCUMENTS

| | | | |
|---|---|---|---|
| 2006/0195839 A1* | 8/2006 | Lin | G06F 8/60 717/174 |
| 2006/0212865 A1* | 9/2006 | Vincent | G06F 8/65 717/168 |
| 2008/0178173 A1* | 7/2008 | Sriram et al. | 717/176 |
| 2008/0295086 A1* | 11/2008 | Greenwood | G06F 8/65 717/168 |
| 2008/0301669 A1* | 12/2008 | Rao | G06F 8/65 717/173 |
| 2009/0217163 A1* | 8/2009 | Jaroker | G06F 8/60 715/700 |
| 2009/0222811 A1* | 9/2009 | Faus | G06F 8/65 717/173 |
| 2010/0131084 A1* | 5/2010 | Van Camp | G06F 8/65 700/86 |
| 2010/0257517 A1* | 10/2010 | Sriram et al. | 717/168 |
| 2011/0126187 A1* | 5/2011 | Alberti et al. | 717/172 |
| 2011/0138374 A1* | 6/2011 | Pal | 717/169 |
| 2011/0225575 A1* | 9/2011 | Ningombam et al. | 717/170 |
| 2011/0302570 A1* | 12/2011 | Kurimilla | G06F 8/60 717/170 |
| 2012/0331455 A1 | 12/2012 | Ayachitula et al. | |
| 2013/0007693 A1* | 1/2013 | Bliss | G06F 8/61 717/101 |
| 2013/0138783 A1* | 5/2013 | Mallur | G06F 8/65 709/221 |
| 2014/0337830 A1* | 11/2014 | Schwaninger | G06F 8/61 717/177 |
| 2015/0082292 A1* | 3/2015 | Thomas | G06F 8/61 717/168 |

OTHER PUBLICATIONS

Mikhailov, Sergei and Stanton, Jonathan, AIS: A Fast, Disk Space Efficient "Adaptable Installation System" Supporting Multitudes of Diverse Software Configurations, [Online] Nov. 2004, Proceedings of LISA '04: [Retrieved from the Internet] <https://www.usenix.org/legacy/events/lisa04/tech/full_papers/mikhailov/mikhailov_html/> pp. 105-112.*

Giuffrida et al., Safe and automatic live update for operating systems, [Online] Mar. 16, 2013, ASPLOS '13, ACM, New York, NY, USA, [Retrieved from the Internet] <http://dx.doi.org/10.1145/2451116.2451147> pp. 279-292.*

* cited by examiner

DYNAMICALLY GENERATE AND EXECUTE A CONTEXT-SPECIFIC PATCH INSTALLATION PROCEDURE ON A COMPUTING SYSTEM

BACKGROUND

1. Field of the Disclosure

This disclosure relates generally to patch installation, and more particularly to systems and methods for dynamically generating and executing context-specific patch installation instructions on a distributed computing system.

2. Description of the Related Art

Deploying updates in computing systems often proves an onerous task. A variety of diverse subsystems, servers, computers, and other devices may be configured in countless different ways to create a particular computing system, leaving parties responsible for performing updates with the challenge of developing and executing an installation plan that is specific to the configuration of the particular system. Typically, an update, such as a patch, is provided with a generic installation procedure. This procedure may include many possible steps or instructions, some of which may be skipped, performed without effect, or performed differently according to the configuration of the particular system on which the patch is being deployed. Following such a generic procedure may lead to inefficient, if not incorrect, patch installations. Just as likely, a patch may require extra instructions not included in the given generic installation procedure. Without expert intervention, some patch installations may be too difficult for a system administrator to navigate and/or modify the given generic installation instructions.

SUMMARY

Embodiments of dynamically generating and executing a context-specific patch installation procedure on a computing system are described herein. In various embodiments, a computing system may be configured in a variety of different ways. In some embodiments, for example, a computing system may be a distributed computing system, employing many different devices or nodes. When a computing system is the target for a patch installation, the configuration of a computing system may be taken into account as the installation procedure for the patch is generated and executed. Configuration data may be used to indicate the configuration of the computing system. Metadata may also be obtained that describes the operations to be performed when installing a patch. Based on both the configuration data and the patch installation metadata, a patch installation procedure may be generated for installing the patch that is specific to the patch and the configuration of the computing system. The patch installation procedure may then be automatically executed to install the patch on the computing system.

In some embodiments, for example, configuration data may be received for a computing system that is the target for installation of a patch. The configuration data may be a configuration model for the computing system. Installation metadata that describes the operations to be performed when installing a patch on the computing system may also be received. A patch installation procedure specific to the configuration of the computing system and the patch may be generated based on the configuration data and the installation metadata. The patch installation procedure may then be executed to automatically install the patch on the computing system. In some embodiments a patch may be a set of patches and patch installation procedures may be generated for each patch of the set of patches.

In at least some embodiments, multiple installation instructions may be generated for a patch specific to the configuration of the computing system based on automation metadata for the patch. A patch mapping data store may be accessed to obtain mapping data for the installation instructions and the patch installation procedure may be built from the generated installation instructions based on the automation mapping data. In some embodiments, installation instructions that are of an abstract installation type may be replaced with one or more directly executable installation instructions.

In various embodiments, an indication of an installation option of multiple different installation options may be received, and the patch installation procedure may be modified in accordance with the installation option. Installation options may include in-place patch installation, out-of-place patch installation, rolling patch installation, and/or parallel patch installation.

Figure 1:
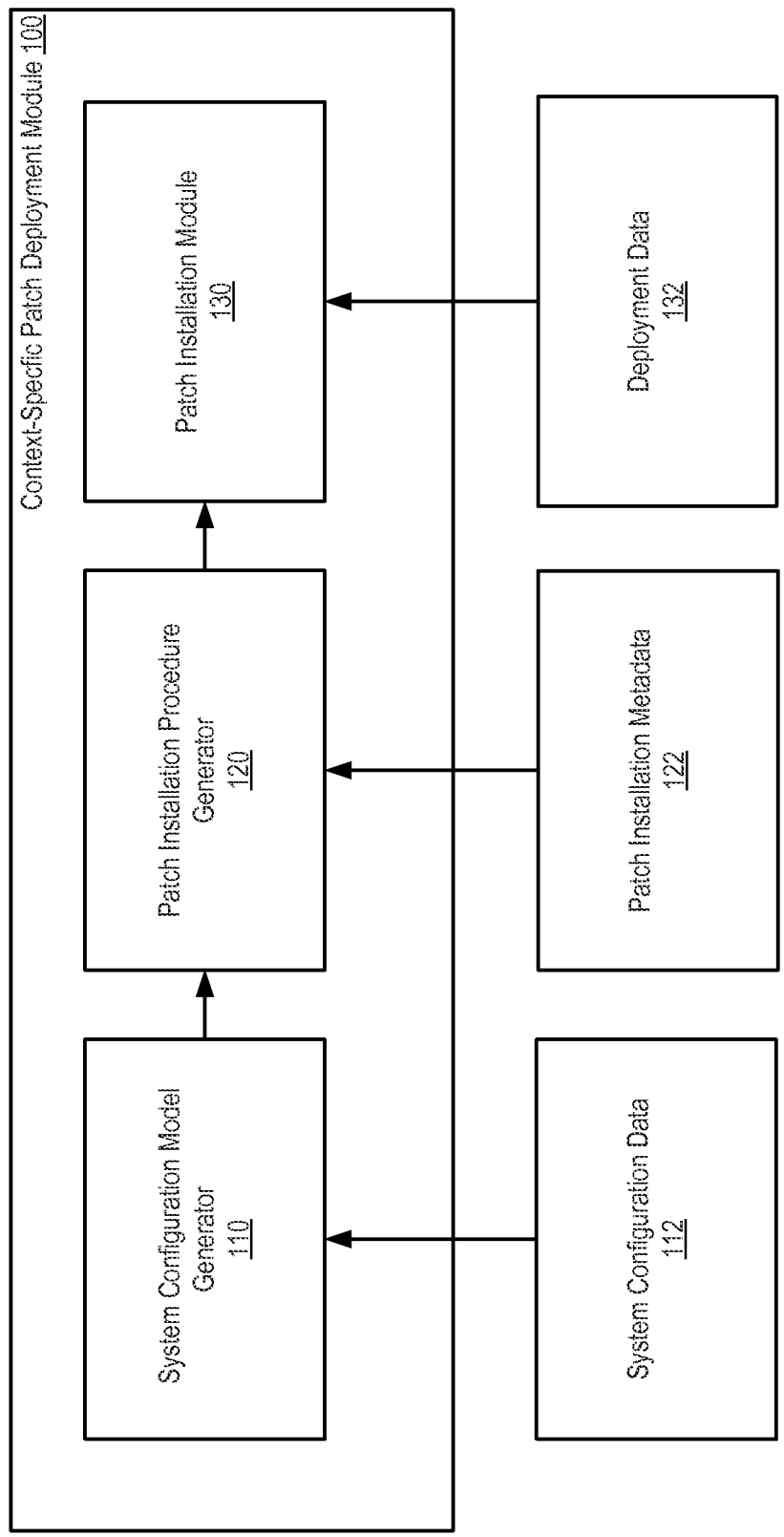
FIG. 1 is a block diagram illustrating an example context-specific patch deployment module, according to some embodiments.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

As systems grow and change over time, the complexity of maintaining and updating systems increases. For system administrators to combat the ever-present challenge of deploying system patches as part of the continual maintenance and improvement of systems, some patch installations may include patch installation procedures that are specific to the context of the system on which they may be executed. Various embodiments of dynamically generating and executing a context-specific patch installation procedure on a computing system are described herein.

Generally, a computing system is any combination of software and/or hardware devices configured to accomplish a common goal. A computing system may be a single physical or logical machine, such as computing system 1000 described below with regard to FIG. 8. However, in at least some embodiments, the combination of hardware and software devices may be configured to implement multiple nodes of a distributed computing system. The variety of different software and/or hardware devices that make up a distributed computing system are often referred to as nodes of the distributed computing system. Each node may be an autonomous hardware system or device, such as system 1000 described below with regard to FIG. 8, or an autonomous software system or device. Nodes may be configured to communicate with one another using multiple different communication protocols and techniques, such as through various networks. Groups of nodes, sometimes referred to as clusters, may be implemented in a distributed computing system to work together to provide one or more services or functions of a distributed computing system.

A computing system may be implemented to provide a variety of different services and functions. For example, a computing system may provide a database management system, providing access to and services for data stored on data storage devices. A distributed computing system made up of a multiple different nodes may also provide multiple different services and functions. Similar to the example given above, a distributed computing system may implement a distributed database system, using a system management node or cluster of nodes, data storage node or cluster of nodes, and a storage management node or cluster of nodes may be implemented to store and retrieve data from the data storage devices. A host of other types and configurations of computing systems (e.g., various telecommunication systems, network applications, real-time process controls, parallel computations, etc.) are well-known to those of ordinary skill in the art, and thus the above examples are not intended to be limiting.

A patch may be a portion of software designed to repair or update a system upon which it is installed. The software patch may be transported and installed in a variety of different ways. Some software patches are distributed as binary executables that, in other words, do not contain the source code of the patch in the patch actually distributed. Alternatively, some patches may be distributed with some or all of the source code and may require compilation before installation at the target system. Although patch is commonly used to mean a small repair or update to a system, some patches may require large repairs, updates, or changes to a target system. Thus, the term patch as used in this specification may not be limited to repairs, updates, or changes of a certain size. Similarly, a patch may itself include several patches, i.e. a set of patches, and although the term may be used through this specification in its singular form, the various embodiments described herein may also perform similar methods and techniques with regard to the patches of a set of patches. To install a patch on a target distributed computing system, the patch need not be installed on all of the nodes of targeted distributed system. Patches may be installed on only a subset of the nodes included in the targeted distributed computing system.

As noted above, typically when a computing system is a target for a patch installation, a set of generic installation instructions may be provided. These generic patch installation instructions may be agnostic of the specific configuration of the targeted computing system. FIG. 1 is a block diagram illustrating an example dynamic patch deployment module which may implement the various methods and techniques of dynamically generating and executing a context-specific patch installation procedure, according to some embodiments. Context-specific patch deployment module 100 may be implemented on one or more computing devices, such as computer system 1000 described below with regard to FIG. 8, servers, computer clusters, or any other computing device configured to dynamically generate and execute a context-specific patch installation procedure for a computing system.

Context-specific patch deployment module 100 may, in some embodiments, receive system configuration data for a computing system, generate a configuration model indicating the configuration of the computing system, and generate a patch installation procedure to install the patch on the computing system that is specific to both the configuration of the computing system and the patch. Context-specific patch deployment module 100 may then execute the patch installation procedure.

In some embodiments, context-specific patch deployment module 100 may implement a system configuration model generator 110. System configuration model generator 110, such as described in more detail below with regard to FIG. 3, may receive configuration data, such as system configuration data 112 for a computing system. Configuration data may include the various associations and dependencies of hardware and/or software devices, such as different processes or applications implemented on the computing system. For computing systems that are distributed computing systems include multiple nodes, the configuration data may also describe the various associations and dependencies between the different nodes of the distributed computing system. The various run-time behaviors and data exchanges, for instance, between application nodes, database nodes, and controls nodes of a distributed computing system. System configuration data 112 may be accessed or received from a data store, or another source that collects or stores configuration data for the computing system. In some embodiments, this configuration data may be passed directly to patch installation procedure generator 120.

However, in at least some embodiments, system configuration model generator 110 may generate a configuration model of the computing system. This configuration model may, for example, indicate the configuration of the nodes included in a distributed computing system, or other dependencies of a computing system. Further discussion in greater detail is given below with regard to FIG. 3. Then, the system configuration model generator 110 may provide the configuration model to a patch installation procedure generator 120.

Context-specific patch deployment module 100 may, in some embodiments, include a patch installation procedure generator 120. Patch installation procedure generator 120, such as described in more detail below with regard to FIG. 4, may generate a patch installation procedure specific to both the patch and the configuration of the computing system. If, for example, a distributed system is the target for installation of a patch, then patch installation procedure generator 120 may dynamically generate a patch installation procedure for the given patch specific to the configuration of the nodes of the distributed computing system. In addition to configuration data for the target computing system, patch installation procedure generator 120 may receive patch installation metadata 122 describing operations to be performed to install the patch. Patch installation metadata 122 may describe installation operations for a variety of different system configurations and patch installation options (e.g., in-place patching, out-of-place patching, rolling patching, or serial patching). Patch installation metadata 122 may be received along with a patch itself, separately from the same or different source as a patch, or access from a data store, such as the system manager data store 164 described below with regard to FIG. 2. Patch installation metadata may then be used by patch installation procedure generator 120 to generate the patch installation procedure.

Patch installation procedure generator 120 may generate a patch installation procedure based on both the system configuration data 112 and the installation metadata for the patch 122. The patch installation procedure is specific to the patch and the configuration of the target computing system, and, when executed, may automatically install the patch on the target computing system. Patch installation procedure generator 120 may, in some embodiments generate multiple installation instructions specific to the configuration of the target computing system based on patch installation metadata 122. These installation instructions may constitute a patch installation plan for the target computing system. In at least some embodiments, the installation instructions, or the patch installation plan, may be in a human-readable format. Patch installation procedure generator 120 may then access automation mapping data for the instructions, and build the patch installation procedure from the installation instructions based, at least in part, on the automation mapping data.

In some embodiments, context-specific patch deployment module 100 may also include patch installation module 130. Patch installation module 130, such as described in more detail below with regard to FIG. 5, may receive a patch installation procedure from the patch installation procedure generator 120 and execute the patch installation procedure to install the patch on the computing system. Execution of the patch installation procedure may be automated. When a patch installation procedure is performed may be automatic (e.g., when the patch installation procedure is received), or in response to an input or indication to start the patch installation (e.g., receiving an indication via a user interface that the patch installation is to proceed). In at least some embodiments, patch installation module 130 may receive an indication of an installation option and modify the patch installation procedure according to the installation option. For example, patch installation module 130 may receive an indication that the rolling patch installation option has been selected for a given patch installation. Patch installation execution engine 130 may then modify the patch installation procedure such that it is performed in a rolling installation manner (i.e., the patch installation on each component of the system is performed one at a time in rolling fashion).

Context-specific patch deployment module 100 may be implemented on a variety of different system configurations. FIG. 1, illustrates an example computing system including a context-specific patch deployment module which may implement various embodiments of dynamically generating and executing a context-specific patch installation procedure on the illustrated computing system. Although illustrated in the context of a distributed computing system with multiple nodes, FIG. 1 may also be implemented as a single computing system. Alternatively, in some embodiments, context-specific patch deployment module 100 may be implemented as part of a service, such as third-party service, external to the computing system 190.

Computing system 190 may represent any one of the various examples of computing systems given above. In at least some embodiments, computing system 190 may illustrate an example of a distributed computing system. As a distributed computing system, computing system 190 may implement a variety of different nodes, such as node 1 (182), node 2 (184), up until node N (186), to implement many different services, applications, or functions. These one or more services, applications, or functions may be provided to distributed system clients 192, which may be one or more computing devices, such as system 1000 described below with regard to FIG. 8, operated by one or more users to receive access to the services, applications, or functions of distributed system 190. Again, as discussed previously, the illustrated nodes may be grouped into one or more clusters or groups of nodes that work together to perform one or more services or functions of the distributed computing system. For example, node 1 (182) and node 2 (184) may be clustered together to provide a database in distributed system 190. Single nodes may also be implemented to perform one or more services or functions of the distributed computing system. Continuing with the above example, Node N (186) may implement a human resources record retrieval service that interacts with the database implemented by nodes 1 (182) and 2 (184) to store and retrieve human resources records.

In some embodiments, computing system 190 may also implement a system manager 160. A system manager 160 may be implemented on one or more computing devices, such as system 1000 described below with regard to FIG. 8, configured to manage computing system 190. For example, a system manager 160 may be implemented on a cluster of computing devices configured to work together to provide the system manager 160 services and functionalities. System manager 160 may be configured to communicate with the nodes, node 1 (182) through node N (186), of distributed system 190. Such communication may be implemented using a variety of communication methods and techniques, such as standard (e.g., hypertext transfer protocol (HTTP)) or customized protocols or messages (e.g., different application programmer interfaces (APIs)), over wired or wireless networks or other communication mediums, using a variety of different hardware and/or software devices to transmit, receive, and process communications. As the communication between nodes and other systems, such as system manager 160, are well-known to those of ordinary skill in the art, the above examples are not intended to be exhaustive or limiting.

System manager 160 may implement a variety of services, such as other system manager services 170. These services may include, but are not limited to, changing the configuration of the nodes of the system (or other components, hardware or software of a single computing system), starting and restarting one or more nodes of the system, controlling access to the system, monitoring performance of the system, or enabling system backups. More generally, a system manager 160 may be configured to perform any task necessary to manage computing system 190.

In some embodiments, system manager 160 may implement a system manager user interface 162. The system manager user interface 162 may allow a system administrative client 150 to interact with and/or provide inputs or selections to the system manager 160. For example, system manager user interface 162 may generate one or more html or web pages and provide those pages to system administrative client 150, which may be a desktop or other computing device such as system 1000 described below with regard to FIG. 8. A user of the system administrative client 150, such as a system administrator or other user responsible for the management or maintenance of distributed system 190, may then provide inputs or selections to the system manager user interface 162 via the generated html pages for the other distributed system manager services 170, context-specific patch deployment module 100, or system manager data store 164. System manager user interface 162 may communicate with one or more system administrative clients 150 using the many different communication methods and techniques discussed above with regard to the communication between the system manager 160 and the one or more nodes, 182-186, of the computing system 190.

System manager 160 may, in some embodiments, include a system manager data store 164. System manager data store 164 may provide data storage for the data used by other system manager services 170 or context-specific patch deployment module 100. The contents or management of system manager data store 164 may be managed by one or more of the other distributed system manager services 170 and/or may receive input from a system administrative client 150 via system manager user interface 162. Although not illustrated in FIG. 1, system manager data store 164 may be implemented on one or more storage devices external to the one or more computing devices implementing system manager 160. In some embodiments, the nodes of computing system 190, nodes 182 through 186, may be configured to store and retrieve data from the system manager data store 164. For instance, nodes 182 through 185 may implement reporting modules that send configuration and performance data for the node to the system manager data store 164 for storage. Alternatively, system manager 160 may request and receive data from the nodes, 182 through 186, and store the data in the system manager data store 164.

In some embodiments, system clients 192, may be one or more systems or devices, such as computer system 1000 described below with regard to FIG. 8, configured to communicate with computing system 190. Computing system 190 may, for example, provide back-end data storage services for an e-commerce network-based site (e.g., a website), and system clients 192 may be other components of the network-based site configured to request the performance of various operations by computing system 190. In some embodiments, system clients 192 may communicate with one or more particular nodes, such as Node 1 (182), which performs a particular function, such as a query handling service. In at least some embodiments, different installation options may be implemented by context-specific patch deployment module 100, such that when patch installation procedures are executed for computing system 190, system clients 192 are agnostic of any change in performance. For example, an out-of-place patching installation option, may allow for patches to be installed on cloned nodes, and once the installation procedure is complete, services and functions performed by the original nodes will be redirected to the cloned nodes including the installed patch with little or no interruption of services.

Figure 2:
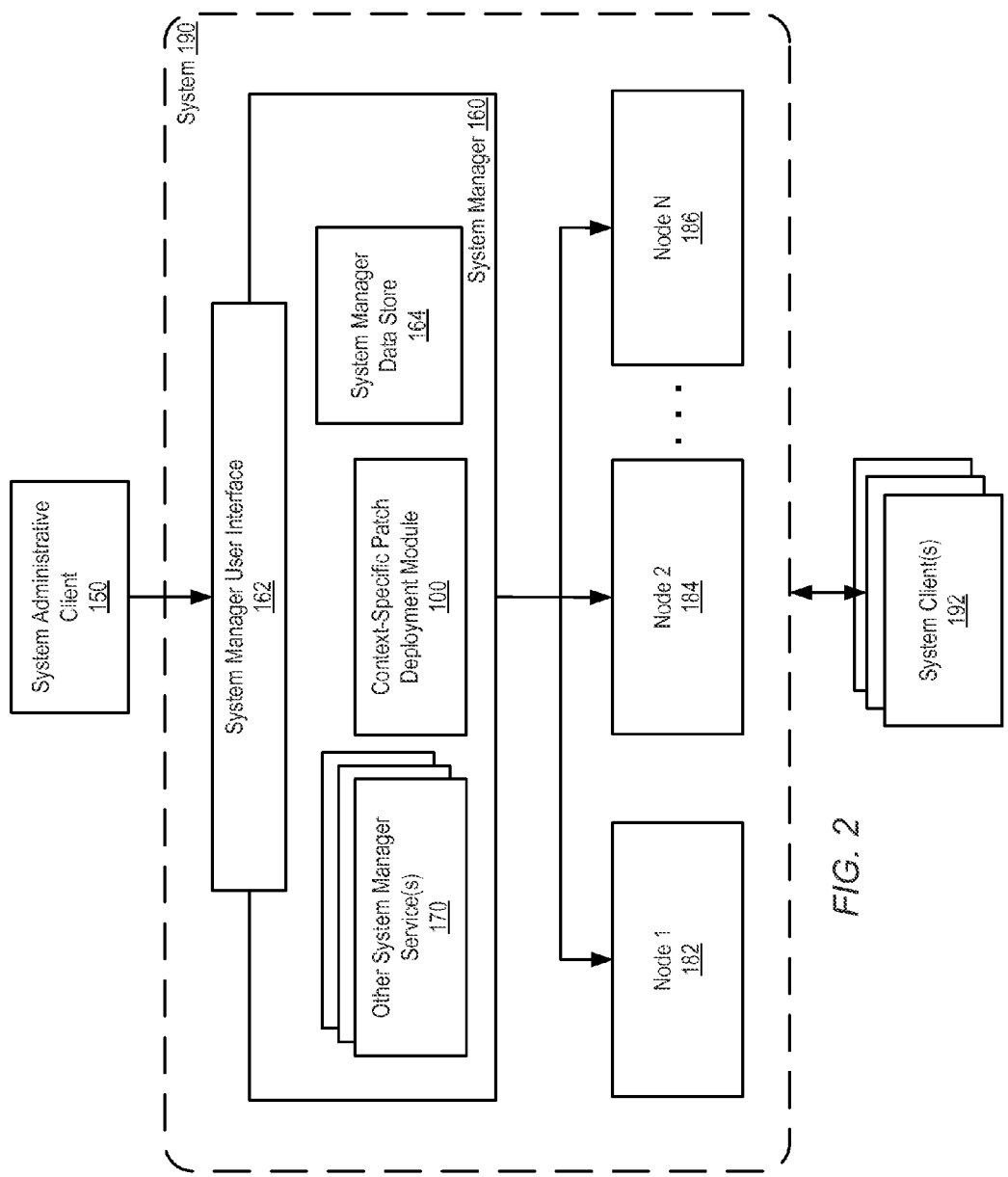
FIG. 2 is a block diagram illustrating an example computing system including a context-specific patch deployment module, according to some embodiments.

Please note, that although illustrated using multiple nodes, FIG. 2 is not to be interpreted as limiting as to other embodiments implementing dynamically generating and executing a context-specific patch installation procedure using the various methods and techniques presented for a single computing system, or a distributed computing system with less than the illustrated number of nodes. Many different computing system architectures, such as those discussed below with regard to FIG. 8, may implement the context-specific patch deployment module and/or the various methods and techniques discussed below.

Distributed Computing System Configuration Data

Figure 3:
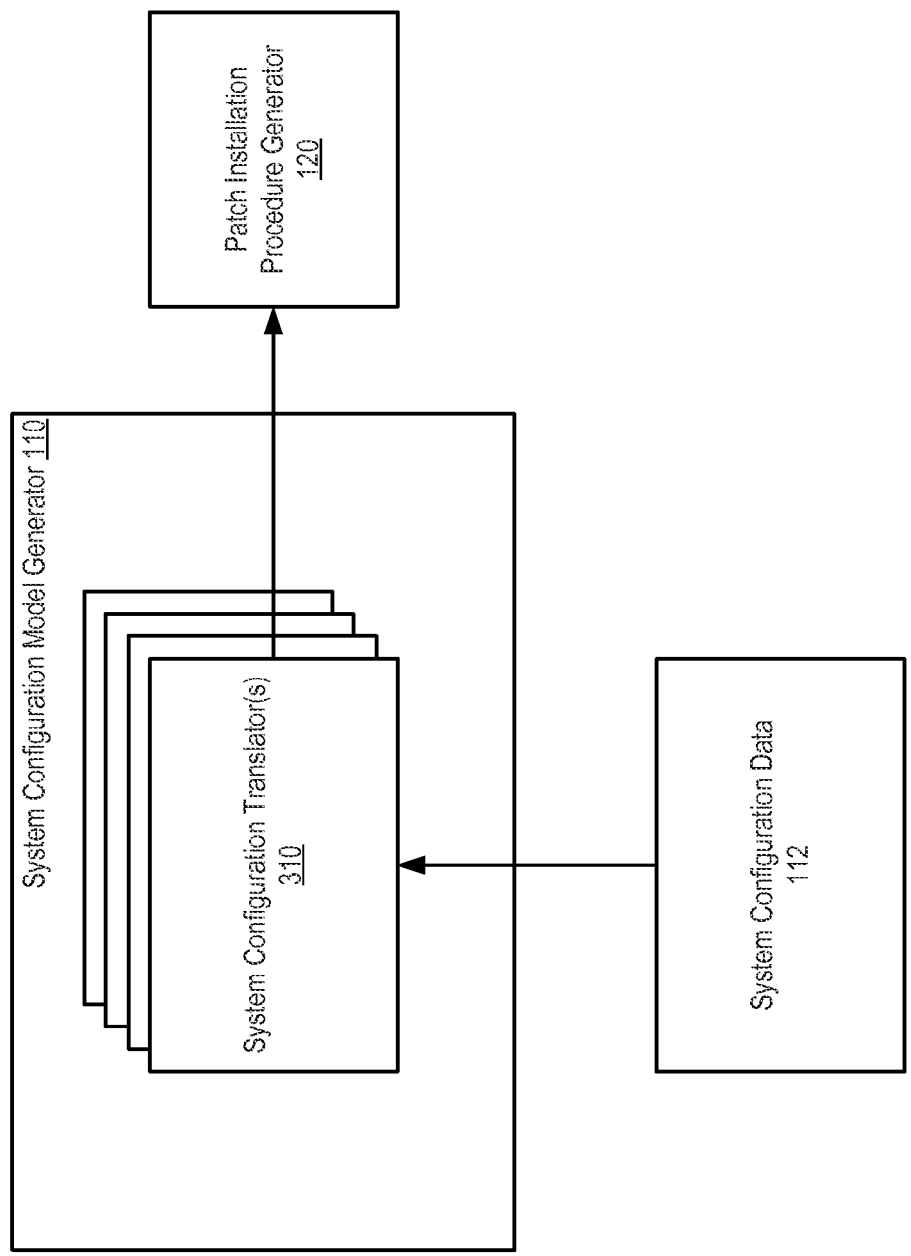
FIG. 3 is a block diagram illustrating an example system configuration model generator, according to some embodiments.

A context-specific patch deployment module, such as context-specific patch deployment module 100 discussed above with regard to FIGS. 1 and 2, or any other system or device configured to dynamically generate and execute a context-specific patch installation procedure on a computing system, may receive configuration data for a distributed computing system. In some embodiments, a context-specific patch deployment module may implement a system configuration model generator, such as system configuration model generator 110 discussed above with regard to FIG. 1. FIG. 3 is a block diagram illustrating an example system configuration model generator 110, according to some embodiments.

System configuration model generator 110 may, in some embodiments, receive configuration data for a computing system from different sources. For example, system manager data store 164 may store system configuration data 112, which may then be provided to system configuration model generator 110. This system configuration data 112 may be stored in a data store, such as system manager data store 164 when the distributed computing system is constructed or deployed (e.g., when operating system or other application, such as a database manager application, is shipped), such as when individual nodes or other components of the computing system are installed or included in the computing system. For instance, when a database management system is deployed the specific configuration of database clusters, storage management clusters, and service clusters may be recorded in a single storage location or multiple storage locations within system manager data store 164 as a registry of the nodes in the database management system. When additional nodes are added to the database management system, such as additional nodes added to the database clusters, the additional nodes, and their functions, associations, and/or dependencies may also be added to the system manager data store 164. Alternatively, a computing system, such as the target of the patch installation, or other system or device may provide system configuration data 112 to the system configuration model generator 110. For instance, the context-specific patch deployment module 100 may be implemented by a third-party or other service external to the computing system, and which may then query, request, or be provided with the system configuration data 112. In another example, the nodes of a distributed computing system may register their configuration data (e.g., their interactions with other nodes, dependencies on nodes, etc.) directly with system configuration model generator 110. As the examples above demonstrate, numerous techniques may be implemented to collect, store, and retrieve system configuration data 112 for a computing system, and therefore, the above examples are not intended to be limiting.

As noted above, system configuration data 112 may exist in many different forms. Configuration data may include the various associations and dependencies of hardware and/or software components of a computing system. In a distributed computing system, the various associations and dependencies between the different nodes of the distributed computing system may also be included. The various run-time behaviors and data exchanges, for instance, between application nodes, database nodes, and controls nodes of an example distributed database system. Configuration data may include information describing the architecture of the system (e.g., the operating system, software applications, and other various hardware components or software layers). In a distributed computing system the architecture or arrangement of the nodes may also be included (e.g., client-server, 3-tier, n-tier, peer-to-peer, etc.). Configuration data may also include software interactions and hierarchies, such as class diagrams, to describe the configuration of the computing system.

Configuration data may be stored or transported in a variety of different formats. For example, in some embodiments, configuration data may be represented as unified modeling language (UML) class diagrams, or other standard modeling formats or scripting languages. As modeling and other system description methods and techniques are well-known to those of ordinary skill in the art, the above examples are not intended to be limiting. For instance, a variety of different data structures, such as arrays, graphs, lists, trees, etc., may be used to format the configuration data.

In some embodiments, system configuration model generator 110 may generate a configuration model, based on the received system configuration data 112. System configuration model generator 110 may implement one or more system configuration translators 310. System configuration translators 310 may be configured to receive system configuration data 112 for different hardware and/or software components, nodes, etc. and translate the system configuration data 112 into a configuration model format. For example, system configuration data 112 for a database management system may be represented using UML class diagrams. These UML class diagrams may be received by a system configuration translator 310 that is configured to process the UML class diagrams and generate a configuration model based on the UML class diagrams. In some embodiments, multiple system configuration translators 310 may be implemented to generate a single configuration model. For example, different distributed system configuration translators 310 may be configured to process configuration data for different nodes, types of nodes, services, functions, or any other subcomponent or subsystem of a computing system. Each system configuration translator may, for instance, be configured to interact with a specific component of a computing system. Working together the translated configuration data from the multiple system configuration translators 310 may be combined to form a configuration model. New distributed system configuration translators 310 may be added specific to configuration data that describes new or additional hardware and/or software components, nodes, types of nodes, services, functions, or any other subcomponent or subsystem added to the computing system.

A configuration model generated by system configuration model generator 110 may indicate the configuration of the computing system. The configuration model may be diversely formatted. In some embodiments, the configuration model may be formatted as a group of linked objects, such as class objects of a software language. An application programmer interface (API) may define the software or other descriptive language objects to be used. For instance, when processed by a system configuration translator 310, the configuration data in UML class diagrams, may be returned as a set of Java® class objects defined for the particular types of nodes included in the distributed computing system. Java is a registered trademark of Oracle Corporation headquartered in Redwood City, Calif. More generally, the configuration model may be generated in such a way as to be configured for further processing by the context-specific patch deployment module 100. As FIG. 3 illustrates, in some embodiments, the configuration model generated by the system configuration translators 310 may be provided to a patch installation procedure generator 120, discussed below in greater detail with regard to FIG. 4. Alternatively, in some embodiments system configuration model generator 110 may be configured to request, receive, access or obtain configuration data for the target computing system and provide this raw configuration data directly to patch installation procedure generator 120.

Figure 4:
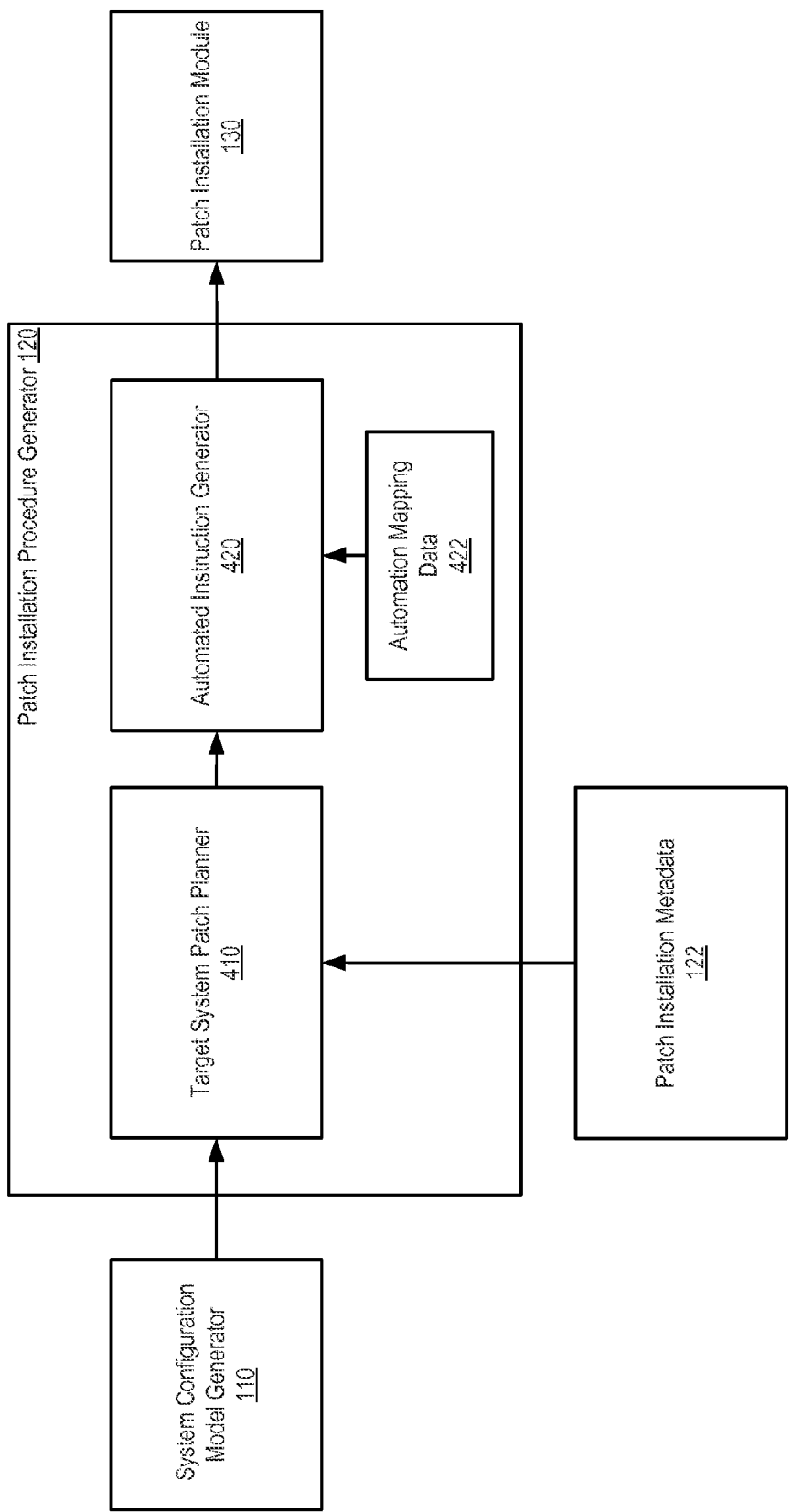
FIG. 4 is a block diagram illustrating an example patch installation procedure generator, according to some embodiments.

Note, FIG. 4 provides an example of system configuration model generator according to some embodiments. Various other components or modules, including various hardware or software components may be implemented by a context-specific patch deployment module to generate a configuration model and/or obtain configuration data for a target computing system, and thus, the illustration in FIG. 4, as well as the above discussion, is not intended to be limiting as to these various other embodiments.

Patch Installation Procedure Generation

Figure 5:
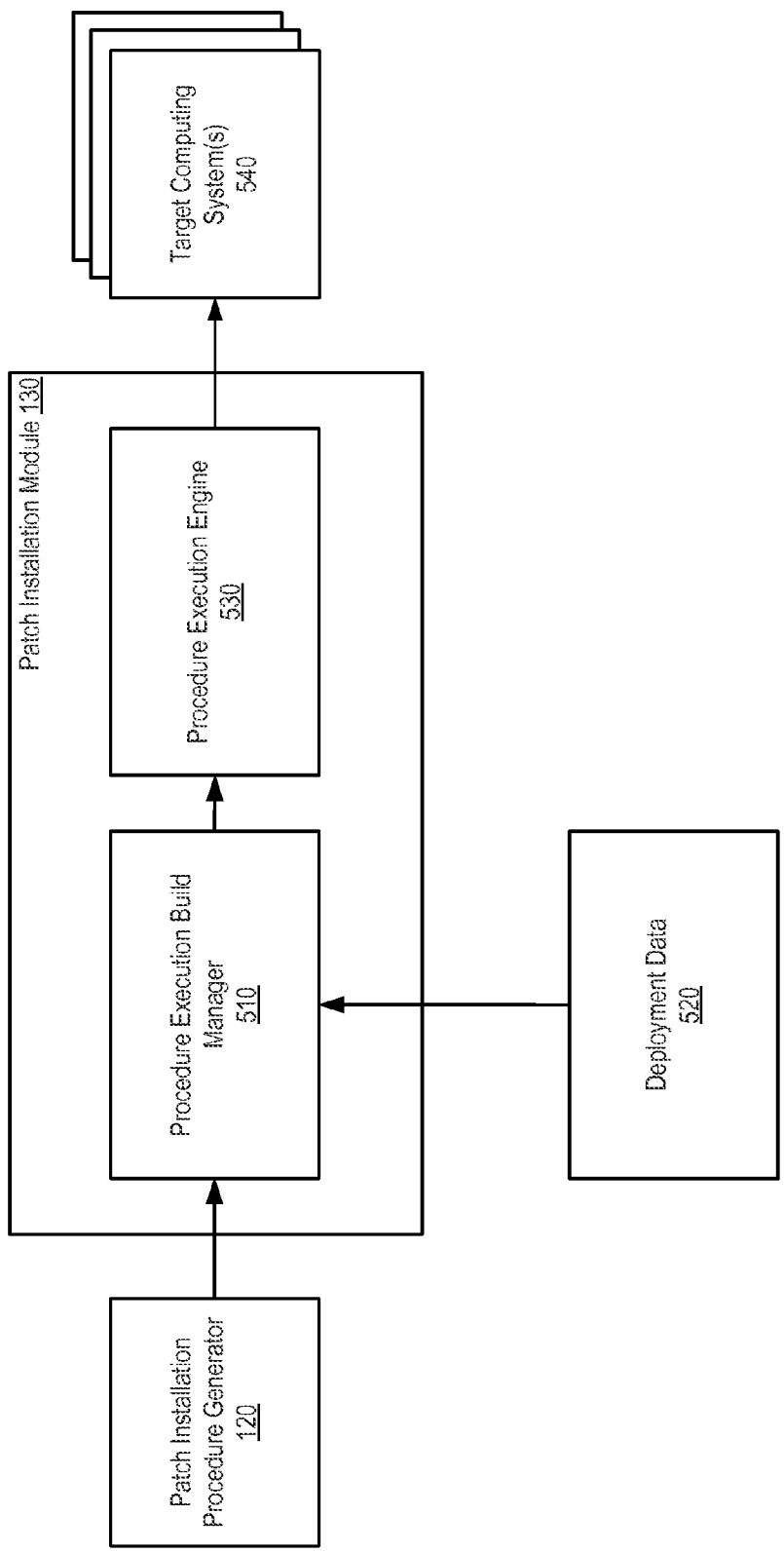
FIG. 5 is a block diagram illustrating an example patch installation module, according to some embodiments.

A context-specific patch deployment module, such as context-specific patch deployment module 100 discussed above with regard to FIGS. 1 and 2, or any other system or device configured to dynamically generate and a execute context-specific patch installation procedure on a computing system, may generate a patch installation procedure specific to the patch and the configuration of the computing system. In some embodiments, this patch installation procedure may be generated specific to the configuration of the computing system indicated by a configuration model. In some embodiments, a context-specific patch deployment module may implement a patch installation procedure generator, such as patch installation procedure generator 120 discussed above with regard to FIG. 1. FIG. 5 is a block diagram illustrating an example patch installation procedure generator, according to some embodiments.

A patch installation procedure generator 120 may, in some embodiments implement a target system patch planner 410. Target system patch planner 410 may generate multiple installation instructions for a given patch. Configuration data, such as a configuration model, may be received by the target system patch planner 410, such as from system configuration model generator 110, described above with regard to FIG. 4. Alternatively, configuration data may be received directly from one or more other systems or components, such as by accessing a data store that contains configuration data for the target computing system. Target system patch planner 410 may also receive patch installation metadata 122, such as described. Patch installation metadata 122 may be stored in a data store, such as system manager data store 164 described above with regard to FIG. 2, or another data storage device accessible to the target system patch planner. Alternatively, the patch installation metadata may be received, in some embodiments, from the source of the patch, such as a patch service, or other third-party or external system, that provides the patch for the computing system.

Patch installation metadata may describe the operations to be performed to install the patch on computing system. Many different configurations, such as the various hardware and software components associations and dependencies that make up the computing system, of many different computing systems may be included in the patch installation metadata 112, as well as any form of information that provides installation requirements or instructions to deploy the patch on the computing system. For example, installation metadata may include, but is not limited to, file paths, scripts or commands for multiple different installation tools, human-readable installation instructions, or any other type of information useful for generating installation instructions for the various configurations of nodes of a distributed computing system. Installation metadata may account for the different installation variables (e.g., installation options, such as in-place or out-of-place installation) in a given configuration of a computing system. In at least some embodiments, the installation metadata may conform to a particular standardized method of description or application programmer interface (API). For example, installation metadata for a patch may be formatted in extensible markup language (XML) using a standardized set of descriptive tags (e.g., <command-action>, <parameter>, <sql-command>, <manual-action>, etc.).

Target system patch planner may use a variety of different techniques to generate context-specific installation instructions for installing the patch on the computing system. For example, the configuration data may be used to match or identify those installation operations described in the installation metadata that are performed to install the patch on the specific configuration of the target computing system. Patch installation metadata may be parsed for the matching installation operations, as well as, general installation operations that may be performed but are not specific to a particular configuration of target computing system. The multiple installation instructions may be generated and stored in various types of data structures or file formats, such as an XML file format, which may then be provided to automated instruction generator 420.

Figure 7:
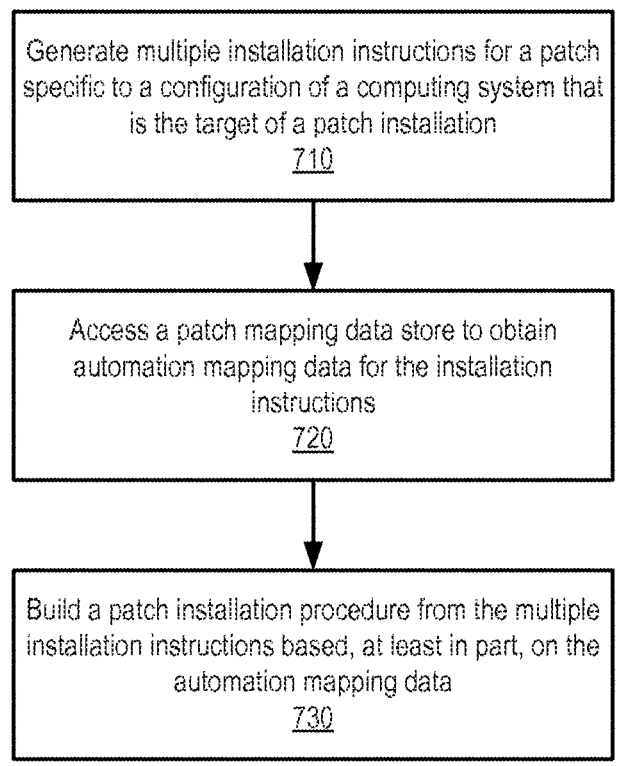
FIG. 7 is a high-level workflow of a method to generate a patch installation procedure specific to a patch and the configuration of a computing system, according to some embodiments.

The multiple instructions generated by target system patch planner 410 may be received by automated instruction generator 420. Automated instruction generator 420 may generate a patch installation procedure specific to the patch and the configuration of the computing system as indicated by the configuration data. Automation mapping data 422, discussed in further detail below, may link the generated context-specific installation instructions, to various functions, components, devices or services that may carry out the installation instructions to install the patch on the computing system. Automation data 422 may be accessed to obtain automation mapping data for the installation instructions generated by target system patch planner 410. This automation mapping data may then be used to generate the patch installation procedure. FIG. 7 below provides further discussion of various methods and techniques automated instruction generator may implement to generate the patch installation procedure. The patch installation procedure may be formatted in a variety of different ways. For example, the patch installation procedure may be generated as a script file, or other text document that can be executed by patch installation module 130, or the patch installation procedure may be composed of compiled code or executables. Automation mapping data 422 may indicate the format of the patch installation procedure generated to be produced.

Once generated, the patch installation procedure may be provided to patch installation module 130 for automatic installation of the patch on the computing system. Note, FIG. 4 provides an example of patch installation procedure generator according to some embodiments. Various other components or modules, including various hardware or software components may be implemented by a context-specific patch deployment module to generate a configuration model and/or obtain configuration data for a target computing system, and thus, the illustration in FIG. 4, as well as the above discussion, is not intended to be limiting as to these various other embodiments.

Patch Installation Execution

Context-specific patch deployment module 100 may also implement a patch installation module 130. Alternatively, various components of patch installation module 130 may be implemented outside of the context-specific patch deployment module, such as procedure execution engine 530. As such, the following description is not intended to be limiting as to the particular logical or physical location of the modules or components described.

A patch installation procedure may be received from patch installation procedure generator 120. As discussed above, a patch installation procedure may be formatted in a variety of different ways. Procedure execution build manager 510 and/or procedure execution engine 530 may be configured to execute the patch installation procedure according to one or more of the format of the patch installation procedure. For example, procedure execution build manager may be configured to read a script file format of the installation procedure. Procedure execution build manager 510 may also be configured to further transform the patch installation procedure received from patch installation procedure generator 120 and transform the procedure into an executable format for the procedure execution engine.

Procedure execution build manager may also be configured to receive deployment data 520. Deployment data may be various build or deployment options, such as installation options, that may be used to further configure or format the patch installation procedure for execution. In at least some embodiments, deployment data includes various installation options. An in-place patching installation option allows the patching installation procedure to be performed directly on the currently operating target computing system. An out-of-place patching installation option allows the patching installation procedure to be performed on one or more cloned systems, and upon completion the currently operating target computing system will be replaced with the patched one or more cloned systems. In distributed computing systems with multiple nodes, a rolling patch installation option provides that a patch may be installed on nodes in a sequence. A parallel patch installation option provides that patch may be installed on multiple nodes in parallel (e.g., at the same or a similar time). These installation options may be selected by a system administrator or other user. Or, the patch installation metadata may itself direct that a particular installation option be employed. Procedure execution build manager 510 may be configured to modify a patch installation procedure according to selected patch installation options. In some embodiments, more than one patch installation option may be selected.

Upon receiving a patch installation procedure, procedure execution engine 530 may be configured to directly, or indirectly carry out the patch installation procedure to automatically install the patch on the target computing system 540. For example, procedure execution engine 530 may be implemented directly on the target computing system, and may directly parse and execute the patch installation procedure on the target computing system. Alternatively, procedure execution engine 530 may be implemented on another system, such as system manager 160 described above with regard to FIG. 2, that directs or instructs the target system to perform the installation procedure and install the patch. If, for example, the target computing system is a distributed computing system, then the procedure execution engine 530 may coordinate and direct the patch installation according to the patch installation procedure for the multiple nodes of the distributed computing system.

Figure 6:
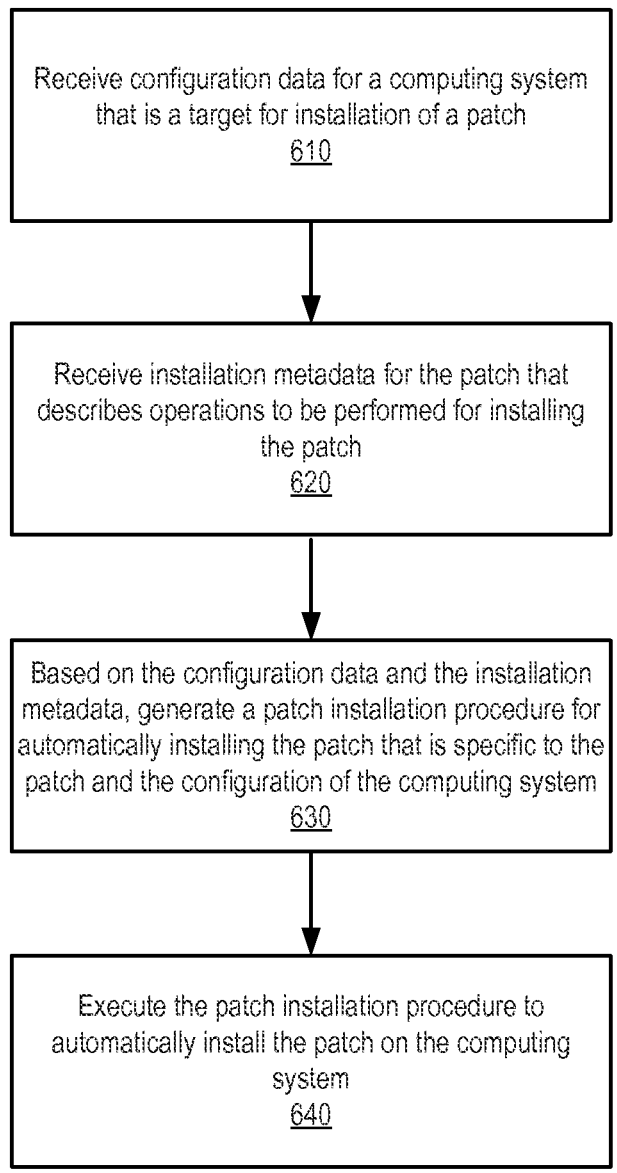
FIG. 6 is a high-level workflow of a method to dynamically generate and execute context-specific patch installation procedure on a computing system, according to some embodiments.

Workflow of Dynamically Generating and Executing Context-Specific Patch Installation As noted above, many different techniques may be implemented to dynamically generate and execute a context-specific patch installation procedure on a computing system, according to some embodiments. FIG. 6 illustrates workflow of such methods to dynamically generate and execute a context-specific patch installation procedure on a distributed computing system, according to some embodiments. Various embodiments of the method may be implemented in a context-specific patch deployment module, such as context-specific patch deployment module 100 discussed above with regard to FIG. 1, as well as the various other components or modules discussed above with regard to FIGS. 2 through 5. One or more computing devices, systems, or nodes of a computing system may also be configured to implement the method.

Computing systems may include many different configurations of nodes or other systems, components, or devices to provide a variety of different computing services. Various forms of configuration data may be used to describe these different nodes or other systems, components, or devices, as well as their various configurations. Configuration data may include the various associations and dependencies between these components and devices, such as between different nodes of a distributed computing system. For example, configuration data may describe the interactions between different nodes, such as in a distributed database management system where a request processing node is associated with one or more data storage nodes to retrieve requested data from the data storage nodes. More generally, configuration data may be used to describe the architecture of a computing system.

In some embodiments, the method to dynamically generate and execute a context-specific patch installation procedure may receive configuration data for a computing system that is a target for installation of a patch, as indicated at 610. As discussed above, configuration data may be received from a data store, such as data store 164 discussed above with regard to FIG. 1, or from another system or device, such as the computing system that is the target for the installation of the patch. Configuration data may be received in various different formats. For example, unified modeling language (UML) class diagrams or other modeling languages may be used to implement the configuration data. Configuration data may be received in response to a request from a device or module implementing the method, such as system configuration model generator 110 discussed above with regard to FIGS. 1 and 3.

In at least some embodiments, a configuration model maybe generated based on the configuration data that indicates the configuration of the computing system. Many different techniques may be used to generate a configuration model for a computing system. In at least some embodiments, the configuration data may be translated by one or more translation engines, such as system configuration translation engines 310 described below with regard to FIG. 3. The translated configuration data may be represented by one or more objects, such as class objects, for instance, linked together to create a model indicating the configuration of the computing system. The configuration model may indicate the various types of dependencies and associations included in the configuration data, such as the various associations and dependencies between the different nodes of distributed computing system. As previously stated, many different techniques for generating a configuration model for a computing system may be well-known to one of ordinary skill in the art, and, therefore, the above example is not intended to be limiting. Numerous data structures, modeling languages, and other combination of software modules/devices or hardware devices may be used to generated a configuration model or other object that indicates the configuration of the nodes in the computing system.

In some embodiments, installation metadata for the patch to be installed on the distributed computing system may be received, as indicated at 620. Installation metadata may describe the operations to be performed to install the patch on computing system. Many different configurations, such as the various hardware and software components associations and dependencies that make up the computing system, of many different computing systems may be included in the installation metadata, as well as any form of information that provides installation requirements or instructions to deploy the patch on the computing system. For example, if the same patch using the same patch installation metadata were installed on systems with different configurations, then the patch installation procedure would each be different. Installation metadata may include, but is not limited to, file paths, scripts or commands for multiple different installation tools, human-readable installation instructions, or any other type of information useful for generating installation instructions for the various configurations of nodes of a distributed computing system. Installation metadata may account for the different installation variables (e.g., installation options, such as in-place or out-of-place installation) in a given configuration of a computing system. In at least some embodiments, the installation metadata may conform to a particular standardized method of description or application programmer interface (API). For example, installation metadata for a patch may be formatted in extensible markup language (XML) using a standardized set of descriptive tags (e.g., <command-action>, <parameter>, <sql-command>, <manual-action>, etc.).

In various embodiments, based on both the configuration data and the installation metadata for the patch, a patch installation procedure may then be generated specific to the patch and the configuration of the computing system as indicated by the configuration data, as indicated at 630. The patch installation procedure may provide for automated installation of the patch on the distributed computing system. Many different techniques may be employed to generate a patch installation procedure, such as the techniques discussed above in greater detail with regard to FIG. 4.

FIG. 7 illustrates a workflow of a method to generate a patch installation procedure specific to a patch and the configuration of a computing system, according to some embodiments. Multiple installation instructions for a patch may be generated, as indicated at 710, based on installation metadata for the patch. As discussed above, installation metadata may describe operations to be performed that install the patch. The installation metadata may be used to identify the operations to be performed to install the patch for the specific configuration of the computing system. For example, the configuration data may identify a particular operating system of the computing system. The installation metadata for the patch may contain the particular commands and steps that instruct the particular operating system to perform the patch installation task. Once identified, the multiple instructions to install the patch may be generated using the installation metadata. In some embodiments, the multiple instructions may constitute an installation plan that is context-specific to the configuration of the computing system. In at least some embodiments, these multiple instructions are in human readable format.

Automation mapping data for the installation instructions may be obtained via access to a patch mapping data store, as indicated at 720. Automation mapping data may link the generated context-specific installation instructions, to various functions, components, devices or services that may carry out the installation instructions to install the patch on the computing system. For example, the installation instruction may be to wait for a certain period of time, and then interrupt or restart a certain process. Automation mapping data may supply the various automated instructions necessary to carry out the generated instruction, such as setting a timer for the certain period of time, and issuing a halt or restart command. In at least some embodiments, installation instructions may of a certain installation instruction type. Directly executable installation type instructions may be those instructions that can be directly executed without modification to carry out the installation instruction on the computing system. For example, an installation instruction may be a specific script or command directly executable in command-line interface. Abstract installation type instructions may be those instructions that cannot be directly executed without modification to carry out the instruction on the computing system. For example, the installation instruction may be a copy command of some data to a "temporary" file location and then perform a certain command, without providing a specific location. In some embodiments, automation mapping data may be used to generate one or more directly executable installation instructions in place of the abstract installation instruction. Continuing with the above example, the automation mapping data may be used to create an instruction that goes to a default file location that already stores the data, and then executes the certain command. Automation mapping data may be used to add, modify, or replace abstract commands with directly executable commands.

A patch installation procedure may then be built from the multiple installation instructions based, at least in part, on the automation mapping data, as indicated at 730. The multiple installation instructions for the patch may be converted into an executable format, such as specific program or file. Automation mapping data may be used to identify a particular format for the patch installation procedure. For example, the automation mapping data may be configured to identify a particular script file format for automated installation on the computing system. In another example, automation mapping data may be used to identify another type of file format, such as an XML or other descriptive language format that may be executable on the target computing system. As installation file formats and techniques are well-known to those of ordinary skill in the art, the above examples are not intended to be limiting.

Returning to FIG. 6, after the patch installation procedure has been generated, the patch installation procedure may be executed to automatically install the patch on the computing system, as indicated at 640. As discussed above with regard to FIG. 5, one or more portions of the patch installation may be executed directly on the computing system. A different system or component of the system may, in some embodiments, process and execute the patch installation procedure by directing the target computing system to perform the patch installation procedure. In some embodiments, executing the patch installation procedure may be performed in response to an indication of a request for the installation of the patch. The patch installation procedure may also be modified in accordance with the selection of installation options.

In some embodiments, elements 620 through 640 may be repeated for a set of patches. For example, the installation metadata for each patch may be used, along with the configuration data to generate a patch installation procedure for each patch of the set of patches. Then each patch installation procedure may be executed for the set of patches.

Although FIG. 6 presents one example embodiment of a method to dynamically generate and execute a context-specific patch installation procedure on a computing system, the elements of FIG. 6 as illustrated are not intended to be limiting as to a particular order. Other orderings of the illustrated elements, as well as additional or different elements may also be included in various embodiments.

Example System

Figure 8:
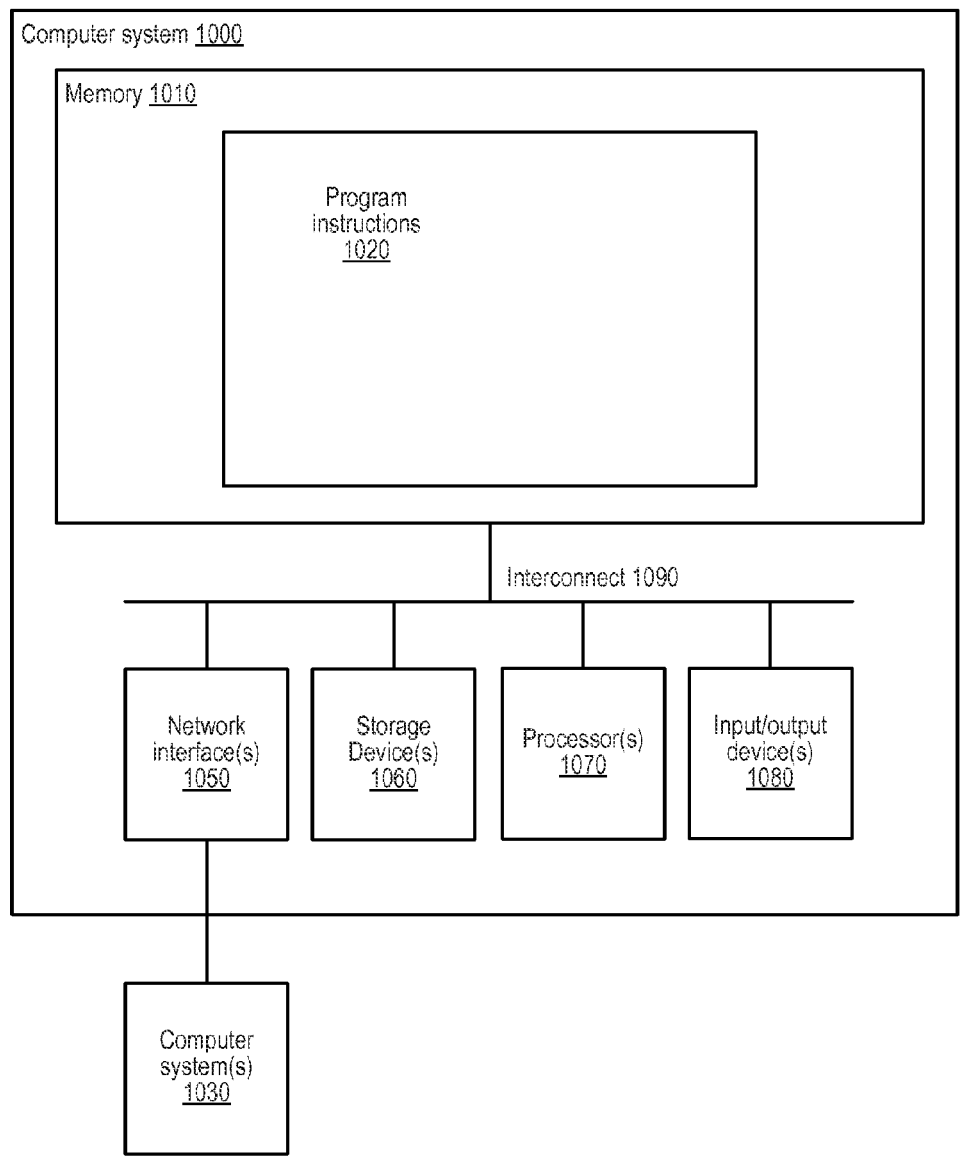
FIG. 8 illustrates an example computing system, according to some embodiments.

FIG. 8 illustrates a computing system configured to implement the methods described herein, according to various embodiments. The computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The mechanisms for implementing dynamically generating and executing a context-specific patch installation procedure on a computing system, as described herein, may be provided as a computer program product, or software, that may include a non-transitory, computer-readable storage medium having stored thereon instructions, which may be used to program a computer system (or other electronic devices) to perform a process according to various embodiments. A non-transitory, computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1000 may include one or more processors 1070; each may include multiple cores, any of which may be single or multi-threaded. Each of the processors 1070 may include a hierarchy of caches, in various embodiments. The computer system 1000 may also include one or more persistent storage devices 1950 (e.g. optical storage, magnetic storage, hard drive, tape drive, solid state memory, etc) and one or more system memories 1010 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 8 (e.g., video cards, audio cards, additional network interfaces, peripheral devices, a network interface such as an ATM interface, an Ethernet interface, a Frame Relay interface, etc.)

The one or more processors 1070, the storage device(s) 1050, and the system memory 1010 may be coupled to the system interconnect 1040. One or more of the system memories 1010 may contain program instructions 1020.

Program instructions 1020 may be executable to implement one or more applications which may include one or more components of context-specific patch deployment module 100, shared libraries, or operating systems. Program instructions 1020 may be encoded in platform native binary, any interpreted language such as Java™ byte-code, or in any other language such as C/C++, Java™, etc or in any combination thereof. The program instructions 1020 may include functions, operations and/or other processes for implementing dynamically generating and executing a context-specific patch installation procedure, as described herein.

In one embodiment, Interconnect 1090 may be configured to coordinate I/O traffic between processors 1070, storage devices 1070, and any peripheral devices in the device, including network interfaces 1050 or other peripheral interfaces, such as input/output devices 1080. In some embodiments, Interconnect 1090 may perform any necessary protocol, timing or other data transformations to convert data signals from one component (e.g., system memory 1010) into a format suitable for use by another component (e.g., processor 1070). In some embodiments, Interconnect 1090 may include support for devices attached through various types of peripheral buses, such as a variant of the Peripheral Component Interconnect (PCI) bus standard or the Universal Serial Bus (USB) standard, for example. In some embodiments, the function of Interconnect 1090 may be split into two or more separate components, such as a north bridge and a south bridge, for example. In addition, in some embodiments some or all of the functionality of Interconnect 1090, such as an interface to system memory 1010, may be incorporated directly into processor 1070.

Network interface 1050 may be configured to allow data to be exchanged between computer system 1000 and other devices attached to a network, such as other computer systems, or between nodes of computer system 1000. In various embodiments, network interface 1050 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1080 may, in some embodiments, include one or more display terminals, keyboards, keypads, touchpads, scanning devices, voice or optical recognition devices, or any other devices suitable for entering or retrieving data by one or more computer system 1000. Multiple input/output devices 1080 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1050.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A method, comprising:
    performing, by one or more computing devices:
        receiving configuration data indicating a configuration of a computing system that is a target for installation of a patch;
        receiving installation metadata for the patch to be installed on the computing system, wherein said installation metadata describes operations to be performed for installing the patch;
        based on both the configuration data and the installation metadata, generating a plurality of installation instructions for the patch specific to the patch and the configuration of the computing system indicated by the configuration data;
        accessing a patch mapping data store to obtain automation mapping data linking the installation instructions to a plurality of components configured to carry out the installation instructions, wherein the automation mapping data links individual ones of the plurality of installation instructions to respective ones of the plurality of components;
        generating, based at least in part on the automation mapping data linking the installation instructions to the components configured to carry out the one or more installation instructions, a patch installation procedure for automatically installing the patch on the computing system, wherein the patch installation procedure is specific to the patch and a configuration of the computing system indicated by the configuration data; and
        executing the patch installation procedure to automatically install the patch on the computing system.

2. The method of claim 1, further comprising:
    receiving an indication of an installation option; and
    modifying the patch installation procedure for execution in accordance with the installation option.

3. The method of claim 1, wherein the computing system is a distributed computing system comprising a plurality of nodes, and wherein the configuration data comprises a configuration model that indicates a configuration of the plurality of nodes of the distributed computing system.

4. A system, comprising:
    one or more computer processors and associated memory; and
    a patch installation procedure generator implemented by the one or more computer processors of the system, configured to:
        receive configuration data indicating a configuration of a computing system that is a target for installation of a patch;
        receive installation metadata for the patch to be installed on the computing system, wherein said installation metadata describes operations to be performed for installing the patch;
        based on both the configuration data and the installation metadata, generate a plurality of installation instructions for the patch specific to the patch and the configuration of the computing system indicated by the configuration data;
        access a patch mapping data store to obtain automation mapping data linking the installation instructions to a plurality of components configured to carry out the installation instructions, wherein the automation mapping data links individual ones of the plurality of installation instructions to respective ones of the plurality of components;
        generate, based at least in part on the automation mapping data linking the installation instructions to the components configured to carry out the installation instructions, a patch installation procedure for automatically installing the patch on the computing system, wherein the patch installation procedure is specific to the patch and the configuration of the computing system indicated by the configuration data;

a patch installation module implemented by the one or more computer processors of the system, configured to:
receive as input the patch installation procedure; and
execute the patch installation procedure to automatically install the patch on the computing system.

5. The system of claim 4, wherein the computing system is a distributed computing system comprising a plurality of nodes.

6. The system of claim 5, wherein the configuration data comprises a configuration model that indicates a configuration of the plurality of nodes of the distributed computing system, and wherein the system further comprises:
a configuration model generator, configured to:
access configuration data for each of the plurality of nodes; and
generate the configuration model based on the accessed configuration data.

7. The system of claim 4, wherein at least one or more of the plurality of installation instructions is an abstract instruction type, and wherein, to build the patch installation procedure from the plurality of installation instructions, the patch installation procedure generator is further configured to:
for the one or more installation instructions of the abstract installation type, generate one or more directly executable installation instructions to be performed in place of the one or more installation instructions.

8. The system of claim 4, wherein the patch installation module is further configured to:
receive an indication of an installation option; and
modify the patch installation procedure for execution in accordance with the installation option.

9. The system of claim 8, wherein the installation option is one of a plurality of different installation options, and wherein the plurality of different installation options comprise at least one of:
in-place patch installation;
out-of-place patch installation;
rolling patch installation; or
parallel patch installation.

10. The system of claim 4, wherein said patch is one of a set of patches, and wherein the patch installation procedure generator is configured to repeat said receiving installation metadata and said generating a patch installation procedure for each other patch of the set of patches, and wherein the patch installation module is configured to repeat said executing the patch installation procedure to install each other patch of the set of patches.

11. A non-transitory, computer-readable storage medium, storing program instructions that when executed by one or more computing devices implement:
a patch installation procedure generator, configured to:
receive configuration data indicating a configuration of a computing system that is a target for installation of a patch;
receive installation metadata for the patch to be installed on the computing system, wherein said installation metadata describes operations to be performed for installing the patch;
based on both the configuration data and the installation metadata, generate a plurality of installation instructions for the patch specific to the patch and the configuration of the computing system indicated by the configuration data;
access a patch mapping data store to obtain automation mapping data linking the installation instructions to a plurality of components configured to carry out the installation instructions, wherein the automation mapping data links individual ones of the plurality of installation instructions to respective ones of the plurality of components;
generate, based at least in part on the automation mapping data linking the installation instructions to the components configured to carry out the installation instructions, a patch installation procedure for automatically installing the patch on the computing system, wherein the patch installation procedure is specific to the patch and a configuration of the computing system indicated by the configuration data;
a patch installation module, configured to:
receive as input the patch installation procedure; and
execute the patch installation procedure to automatically install the patch on the computing system.

12. The non-transitory, computer-readable storage medium of claim 11, wherein the computing system is a distributed computing system comprising a plurality of nodes.

13. The non-transitory, computer-readable storage medium of claim 12, wherein the configuration data comprises a configuration model that indicates a configuration of the plurality of nodes of the distributed computing system, and wherein the program instructions when executed by the one or more computing devices further implement:
a configuration model generator, configured to:
access configuration data for each of the plurality of nodes; and
generate the configuration model based on the accessed configuration data.

14. The non-transitory, computer-readable storage medium of claim 11, wherein at least one or more of the plurality of installation instructions is an abstract instruction type, and wherein, to build the patch installation procedure from the plurality of installation instructions, the patch installation procedure generator is further configured to:
for the one or more installation instructions of the abstract installation type, generate one or more directly executable installation instructions to be performed in place of the one or more installation instructions.

15. The non-transitory, computer-readable storage medium of claim 11, wherein the patch installation module is further configured to:
receive an indication of an installation option; and
modify the patch installation procedure for execution in accordance with the installation option.

16. The non-transitory, computer-readable storage medium of claim 15, wherein the installation option is one of a plurality of different installation options, and wherein the plurality of different installation options comprise at least one of:
in-place patch installation;
out-of-place patch installation;
rolling patch installation; or
parallel patch installation.

17. The non-transitory, computer-readable storage medium of claim 11, wherein a different target computing system is the target of the same patch, and wherein the patch installation procedure generator is configured to perform said receiving the configuration data, said receiving installation metadata, and said generating a patch installation procedure for the different target computing system, and wherein the patch installation procedure generated for the different target computing system is different than the patch installation procedure generated for the computing system.

* * * * *

UNITED STATES PATENT AND TRADEMARK OFFICE
CERTIFICATE OF CORRECTION

PATENT NO.        : 9,489,189 B2                                          Page 1 of 1
APPLICATION NO.   : 13/773478
DATED             : November 8, 2016
INVENTOR(S)       : Sriram et al.

It is certified that error appears in the above-identified patent and that said Letters Patent is hereby corrected as shown below:

In the Drawings

On sheet 1 of 8, in FIG. 1, under Reference Numeral 100, Line 1, delete "Specfic" and insert -- Specific --, therefor.

Signed and Sealed this
Sixth Day of June, 2017

Michelle K. Lee
*Director of the United States Patent and Trademark Office*